(12) United States Patent
Stesel

(10) Patent No.: US 11,987,398 B2
(45) Date of Patent: May 21, 2024

(54) METHOD AND APPARATUS FOR UNDERWATER LAUNCH PLATFORM FOR SPACECRAFT

(71) Applicant: Pritok Capital LLC, Chicago, IL (US)

(72) Inventor: Michael Stesel, Chicago, IL (US)

(73) Assignee: Pritok Capital LLC, Chicago, IL (US)

( * ) Notice: Subject to any disclaimer, the term of this patent is extended or adjusted under 35 U.S.C. 154(b) by 0 days.

(21) Appl. No.: 17/467,361

(22) Filed: Sep. 6, 2021

(65) Prior Publication Data

US 2023/0406547 A1   Dec. 21, 2023

(51) Int. Cl.
  *B64G 5/00*  (2006.01)
  *B64G 1/00*  (2006.01)
  *B64G 1/10*  (2006.01)
  *B64G 1/22*  (2006.01)

(52) U.S. Cl.
  CPC .............. *B64G 5/00* (2013.01); *B64G 1/002* (2013.01); *B64G 1/10* (2013.01); *B64G 1/223* (2023.08); *B64G 2005/005* (2013.01)

(58) Field of Classification Search
  CPC . B64G 5/00; B64G 1/002; B64G 1/10; B64G 2001/1092; B64G 2005/005
  See application file for complete search history.

(56) References Cited

U.S. PATENT DOCUMENTS

| | | | | |
|---|---|---|---|---|
| 3,077,143 A * | 2/1963 | Stalzer | ........... | F42B 15/20 89/1.809 |
| 3,093,033 A * | 6/1963 | Draim | ........... | F41F 3/07 102/378 |
| 3,166,977 A * | 1/1965 | Pickett | ........... | F41F 3/07 89/1.809 |
| 3,180,225 A * | 4/1965 | Draim | ........... | F41F 3/07 102/411 |
| 3,181,422 A * | 5/1965 | Draim | ........... | F42B 15/20 89/1.809 |
| 3,499,364 A * | 3/1970 | Ooge | ........... | F41F 3/07 89/1.817 |
| 3,513,750 A * | 5/1970 | Penza | ........... | F42B 15/20 89/1.819 |
| 4,238,093 A * | 12/1980 | Siegel | ........... | B64F 1/06 244/63 |
| 4,562,979 A * | 1/1986 | Taylor | ........... | B64G 99/00 220/8 |
| 5,908,999 A * | 6/1999 | Kristensen | ........... | F41F 3/04 89/1.801 |
| 6,142,424 A * | 11/2000 | Wagner | ........... | F42B 15/36 244/171.1 |
| 6,227,493 B1 * | 5/2001 | Holemans | ........... | B64G 1/641 285/82 |
| 10,370,121 B1 * | 8/2019 | McGann | ........... | B64F 1/06 |
| 2006/0219846 A1 * | 10/2006 | Johnson | ........... | B64G 1/646 244/158.9 |

\* cited by examiner

*Primary Examiner* — Richard Green
*Assistant Examiner* — Nevena Aleksic
(74) *Attorney, Agent, or Firm* — Benjamin E Carlsen

(57) ABSTRACT

Method and apparatus to efficiently launch spacecraft from underwater. Unfortunately, the prior art processes of launching spacecraft from sea either make no use of water buoyancy or waste use rocket fuel to overcome water resistance. As a result, payloads are smaller than are ideal. The instant invention however adds water buoyancy to increase the overall thrust of the spacecraft and therefore makes the spacecraft more efficient than if launched outside of water.

6 Claims, 5 Drawing Sheets

METHOD AND APPARATUS FOR UNDERWATER LAUNCH PLATFORM FOR SPACECRAFT

FIELD OF TECHNOLOGY

This disclosure relates to enhancing performance of spacecraft launching, and more particularly to spacecraft launching system with pre-ignition, non-combustion or non-ignition acceleration.

BACKGROUND OF THE DISCLOSURE

The various approaches to launch vehicle design may be generally classified into single stage or multistage launch vehicle systems. Single stage launch vehicles employ a single thruster stage which includes all the propellant required to deliver a specified velocity to the payload. Since considerable mass is contained in the propellant tanks, engines and thrust structure, which mass becomes unnecessary once propellant therein is expended, a single stage launch vehicle is inherently of less than optimum efficiency. Multistage launch vehicles, where an entire stage, including propellant tanks and engines, is jettisoned after propellant expenditure, have accordingly been developed and gained predominance for earth orbit launch applications. The Titan is a vehicle having those characteristics.

Some examples of launching rockets by the use of one or more rocket stages are addressed in U.S. Pat. Nos. 10,562,599, 10,443,976, 10,279,898, 9,745,063, 9,739,567, 9,074,844, and 8,434,394. All prior art rockets however suffer from the unavoidable tradeoff of requiring fuel to power the launch but also has the mass of the fuel weighs down the rocket and impairs the launch.

Thus, there is clear utility in a novel apparatus and method for launching rockets or other spacecraft utilizing a non-fuel mass energy source.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

For the purposes of this disclosure, like reference numerals in the figures shall refer to like features unless otherwise indicated. The drawings are only an exemplification of the principles of the invention and are not intended to limit the disclosure to the particular embodiments illustrated.

BRIEF SUMMARY

Figure 1:
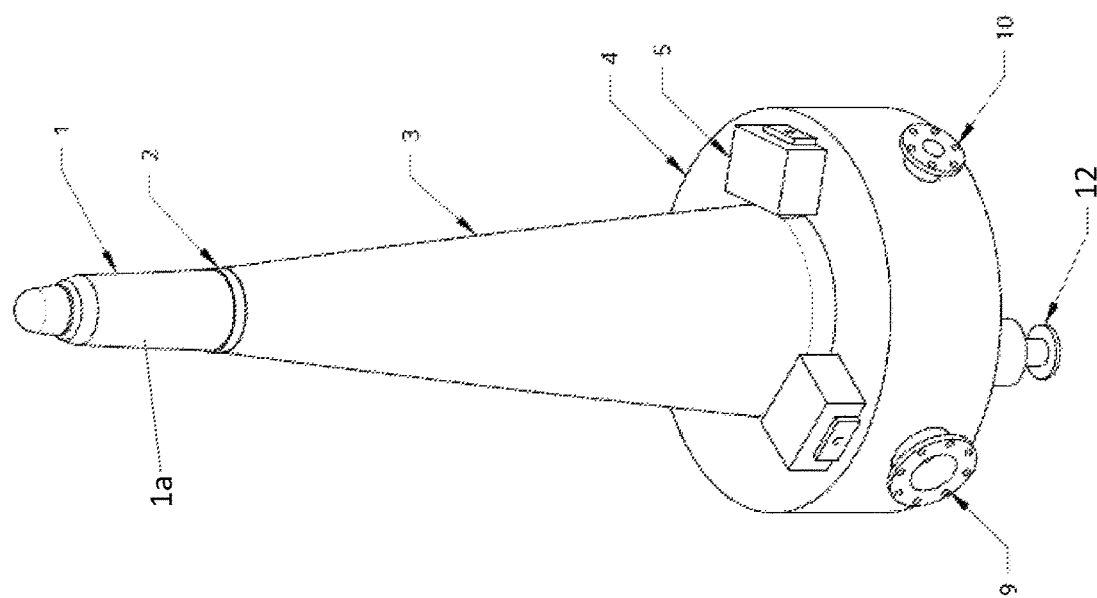
FIG. 1 is a perspective view of the underwater spacecraft launching complex is in a state of readiness for acceleration.

To satisfy the long-felt needs and unsolved difficulties identified above, at least one embodiment is an apparatus comprising a rising portion and a sinking portion. The rising portion includes a launch module, engaged to an accelerating module, and a sinking module comprises a ballast module. The launch module comprises an thrust engine. The accelerating module has a positive buoyancy sufficient to raise the rising portion in a body of water. The ballast module has a negative buoyancy sufficient to pull itself along with the raising portion down in a body of water.

The thrust engine may be a rocket, a cannon, an electromagnetic launcher, a rail gun, or any other thrust mechanism known in the art.

The apparatus may further comprise a launch platform positioned between the accelerating module and the launch module, the launch platform constructed and arranged to receive a blast of rocket thrust and to detach the launch module from the accelerating module when hit with the blast of rocket thrust.

The sinking portion may be positioned on the solid bottom of a body of water. The apparatus may further comprise one or more latching devices releasably engaged to both the ballast module and the accelerating module, the latching devices positioned with equal angular distance from each other. At least one of the latching devices may comprise a block permanently connected to the ballast module and a clamp which engages a contact surface of the accelerating module which has an angle to vertical plane that is less than 5'. The clamp may be guided in block by a ball screw actuator.

The launching module may further comprise a hold and a door constructed and arranged to form a water tight and water pressure resisting seal when closed and to open while in space. The hold may further comprise a satellite constructed and arranged to enter orbit. The apparatus of claim 1 in which the ballast module may be hermetically sealed and may have at least one air-port with at least one two-way valve and at least one water port with a two way valve, the air-port is to an air compressor, the air compressor may be in communication with a ship on the surface of the body of water.

At least one embodiment is directed towards a method of launching a spacecraft. The spacecraft comprises a sinking portion and a rising portion. The sinking portion comprises a ballast module. The rising portion comprises an accelerating module and a launching module. The method comprises the steps of: (1) descending the spacecraft into a body of water, the descent caused by the negative buoyancy of the sinking module; detaching the sinking module from the rising portion; (2) raising the rising portion through the body of water using positive buoyancy of the accelerating module; (3) detaching the accelerating module from the launch module; (4) activating a rocket in the launch module; and (5) raising the rocket module into space.

The accelerating module may have a water displacement volume sufficient to impart a Water Displacement Volume of >1. The spacecraft may be dropped from a ship on the surface of the water into the body of water. The rocket in the launch module may lack the energy to enter orbit absent the added buoyancy of the accelerating module.

DETAILED DESCRIPTION OF THE DISCLOSURE

Definitions

"Water Displacement Volume" or "Vam" means a value according to the equation:

$$Vam = K(Ws+Wam)/\omega$$

where: Ws is the mass of a Ready to Launch Spacecraft
Wam is the mass of Spacecraft or weight of the accelerating module;
ω is the uniform mass of applicable water
K is the thrust coefficient and K is typically ≥1.5

"Thrust Force" or "Ftr" means a value according to the equation:

$$Ftr = \omega Vam - (Ws+Wam)$$

"Spacecraft" means an artifact (such as but not limited to a rocket) constructed and arranged to transit at least a portion of itself from within a gravity well (in particular within a planetary gravity well) of a gravity source to a location at least as far from the gravity source so as to assume an orbit, or even farther. A Spacecraft can include a multistage rocket and satellite in which only the satellite eventually achieves orbit and the remainder burns up or at the end falls or returns to ground.

"Space" means a location, relative to a gravity source, far enough away from the gravity source to allow an object to assume orbit around the gravity source.

"Ready to Launch Spacecraft" means a Spacecraft which is in a ready to launch configuration and which includes the mass of the fuel it will utilize for its launch.

Embodiments

Launching a Spacecraft into Space is a complex endeavor which operates under involves numerous constraints, and which requires the balancing of many costly tradeoffs. As described in detail in the book *Reactive Flying Machines* by Konstantin Tsiolkovsky (Department of Technical Sciences, Academy of Sciences, USSR, as republished and translated by NASA (1954)), the physical energy requirements of such launches are immense and are governed by the rocket equation. When using rocket fuels, because such launches are immensely noisy, hazardous, toxic and destructive, they must be performed in far away and remote locations. The sheer amount of equipment and fuel needed to prepare a Ready to Launch Spacecraft however adds tremendous logistical costs and complexities to such launches.

One approach to remedy these difficulties is using offshore or sea-based launches. By sighting a launch at sea, the use of cargo ships, which are efficient at moving massive amounts of cargo at relatively low costs per pound can be leveraged to a location far from where it will be a nuisance to human settlement. In addition, sea-based launches allow for the siting of the actual launch site in a manner that uses a planet's geography to greatly facilitates the launch itself. Positioning the launch site near the equator increases the amount of centrifugal force provided by the Earth's rotation reducing the amount of fuel needed for a given launch height. In addition, coordinating the launch site with the Earth's rotation at a given location can be utilized to precisely insert a Spacecraft into a desirable orbit trajectory or into a geosynchronous orbit without the need for much or any post-launch orbital adjustments. This can lead to significant saving of fuel needed for launch allowing for the use of larger Spacecraft or Spacecraft containing additional maneuverability fuel which can extend the useful lifespan of the Spacecraft. Prior art examples of sea-based launches include U.S. Pat. Nos. 10,562,599 and 3,181,422.

One manner of further enhancing the efficiency of a sea-based launch is through the use of buoyancy. Buoyancy is the phenomenon of an upthrust, or upward force exerted by a fluid that opposes the weight of a partially or fully immersed object. In a column of fluid, pressure increases with depth as a result of the weight of the overlying fluid. Thus, the pressure at the bottom of a column of fluid is greater than at the top of the column. Similarly, the pressure at the bottom of an object submerged in a fluid is greater than at the top of the object. The pressure difference results in a net upward force on the object. The magnitude of the force is proportional to the pressure difference, and is equivalent to the weight of the fluid that would otherwise occupy the submerged volume of the object, i.e. the displaced fluid.

In at least one embodiment a Thrust Force is exerted on a spacecraft positioned within a body of water due to its buoyancy. The Thrust Force is complementary to the force exerted on the Spacecraft by the use of its fuel source (such as the combustion of rocket fuel).

Figure 1A:
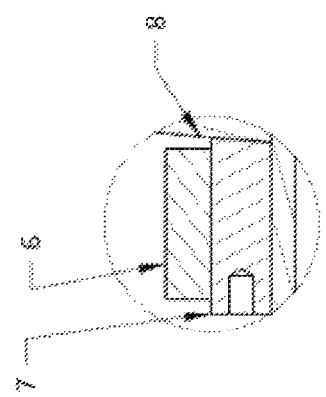
FIG. 1a is an alternative view of a portion of the underwater spacecraft launching complex.
Figure 4:
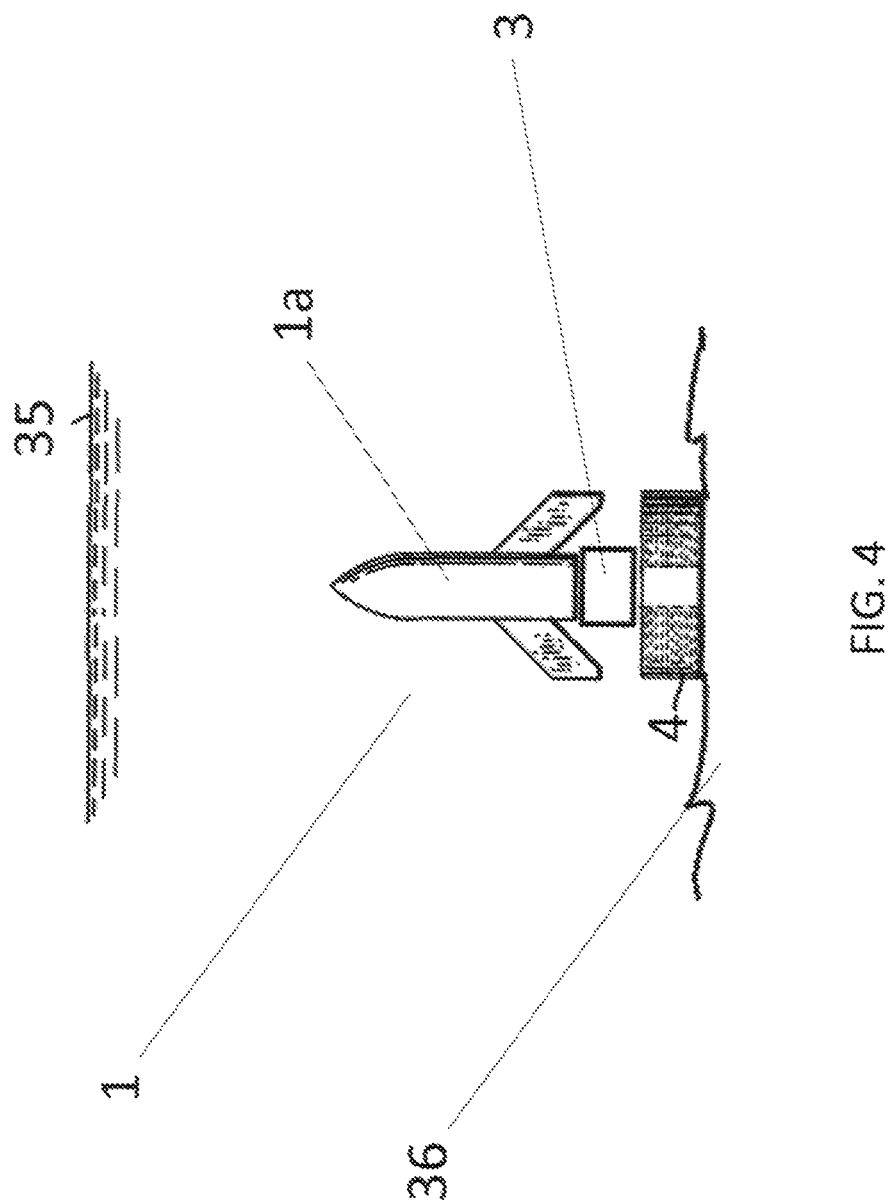
FIG. 4 is a side view of the underwater spacecraft launching complex before launch.

FIG. 4 (and more closely in FIGS. 1 and 1a) illustrates an embodiment comprising a Ready to Launch Spacecraft (1). The Spacecraft (1) includes a launching module (1a) and an accelerating module (3). The launching module (1a) may comprise one or more rocket stages and/or a satellite or other payload for arrival in space. The Spacecraft (b) may be positioned within a body of water and may at least partially or totally submerged. The accelerating module (3) has a buoyancy such that the net buoyancy of the accelerating module (3) imparts a net buoyancy on the combination of the launching module (1a) plus the accelerating module (3). In an embodiment, the net buoyancy is such that even in the absence of rocket thrust, the submerged spacecraft, when free of restraint, would be launched free and clear of the surface of the water (35). In an embodiment, the ballast module (4) has a negative buoyancy such that when engaged to the spacecraft (1) it pulls the spacecraft (1) under the water. In an embodiment, this negative buoyancy can pull the spacecraft (1) all the way down to the floor of the boy of water (36).

In an embodiment the Spacecraft (1) further includes a launching pad (2). The launching pad (2) is a site upon which a rocket engine can blast which facilitates the launching module (1a) away from the accelerating module (3). In an embodiment, the arrangement of the launching module (1a) with the launching pad comprises one, some, or all of the embodiments described in U.S. Pat. No. 3,181,422.

In an embodiment the Spacecraft further comprises a ballast module (4). The ballast module (4) has the net effect of overcoming the buoyancy of the accelerating module (3) to cause the Spaceship (1) as a whole to sink. This can be achieved by the use of counter force (such as propellors or motors) or with the ballast module (4) having a greater mass than the sum of the launching module (1a) plus the accelerating module (3).

In an embodiment, between the ballast module (4) and the accelerating module (3) is positioned, one or more latching devices (5). The latching devices (5) engage or release the ballast module (4) and the accelerating module (3). When operated, initially the latching device engages the two together. The ballast module (4) pulls the Spacecraft (1) down into the water to a location suitable for launch. Once activated, the latching devices (5) cease holding the ballast module to the accelerating module (3). This causes the buoyancy of the accelerating module (3) to thrust upward.

In an embodiment, there are 1, 2, 3 or more latching devices (5). The latching devices may be positioned such that they occupy equal angular distance from each other. One or more of the latching devices may comprise a block (6) permanently connected to the ballast module (4), and clamp (7) that engages contact surface (8) of the accelerating module (3) which has an angle (α) to vertical plane that is less than 5° (in order to reduce movement of the latch needed for release). Clamp (7) may be guided in block (6) and moving by ball screw actuator (not shown) or any other known actuator.

In an embodiment, the accelerating module (3) is a hermetically sealed vessel that has heavy round keel (11) (shown on FIG. 2) to provide vertical position of it.

In an embodiment the accelerating module (3) has a water displacement volume sufficient to impart a Water Displacement Volume of >1.

Ballast module (4) may be a hermetically sealed vessel having at least one air-port (9) with at least one two-way valve (not shown) and at least one water port (10) with a two way valve (not shown). Air-port (9) may be connected by hose (not shown) with an air compressor. The air compressor may be in fluidic communication with an item above the water surface such as a control ship or cargo ship (not shown). Water port (10) may be connected by hose with the water pump on the control ship. To the bottom surface of the ballast module (4) may be attached one or more (including but not less than 3 or more) support assemblies (12) positioned, on equal angular distance. Each of support assemblies (12) has independent controlled lengths adjustment provided by any known means, for example by electricity driven ball screw jack.

In an embodiment the Spacecraft (1) is arranged in a vertical position before launch. This may be accomplished with some or all of the embodiments (such as a platform or ship) described in U.S. Pat. No. 5,908,999. Then water port(s) valve may be opened to accept sea water and the air compressor can pump air out of the ballast module (4). This can cause the entire Spaceship (1) to descend. In an embodiment, the Spaceship (1) descends all the way to the seabed. By extending and retracting support assemblies (12) the Spaceship can be positioned as desired. When using structure (25) ballast module (4) can be attached to free moving block (27).

At the time of the launching the latching devices (5) are activated to became disconnected from the accelerating module (3). The launching module (1a) attached to the accelerating module (3) will be accelerated by hydrostatic force towards surface of the ocean. At calculated moment, the rocket engine of the launching module (1a) is ignited and the launching module (1a) will be separated from launching pad (2) of the accelerating module (3) and began rocket driven ascent.

In an embodiment the spacecraft (1) is positioned in a vertical arrangement while on the surface ship and is dropped into the body of water. In an embodiment the spacecraft (1) remains in a vertical orientation while descending. In an embodiment the spacecraft (1) pitches or yaws as it descends. In an embodiment, one, some or all of the launch module (1a), accelerating module (3) and ballast module (4) comprises shapes or streamlining to facilitate the orientation the spacecraft follows while descending or while ascending. The shapes or streamlining may include one or more of: fins, spirals, twists, tapering, bulging, concave or convex margins along a portion of the perimeter of a fin, caudal fins, dorsal fins, pectoral fins, nacelles, rudders, propellers, diving planes, and any combination thereof. In an embodiment any of these shapes or streamlining may be positioned as positioned on a shark, turtle, submarine (such as an Ohio class), or marine creature.

Figure 2:
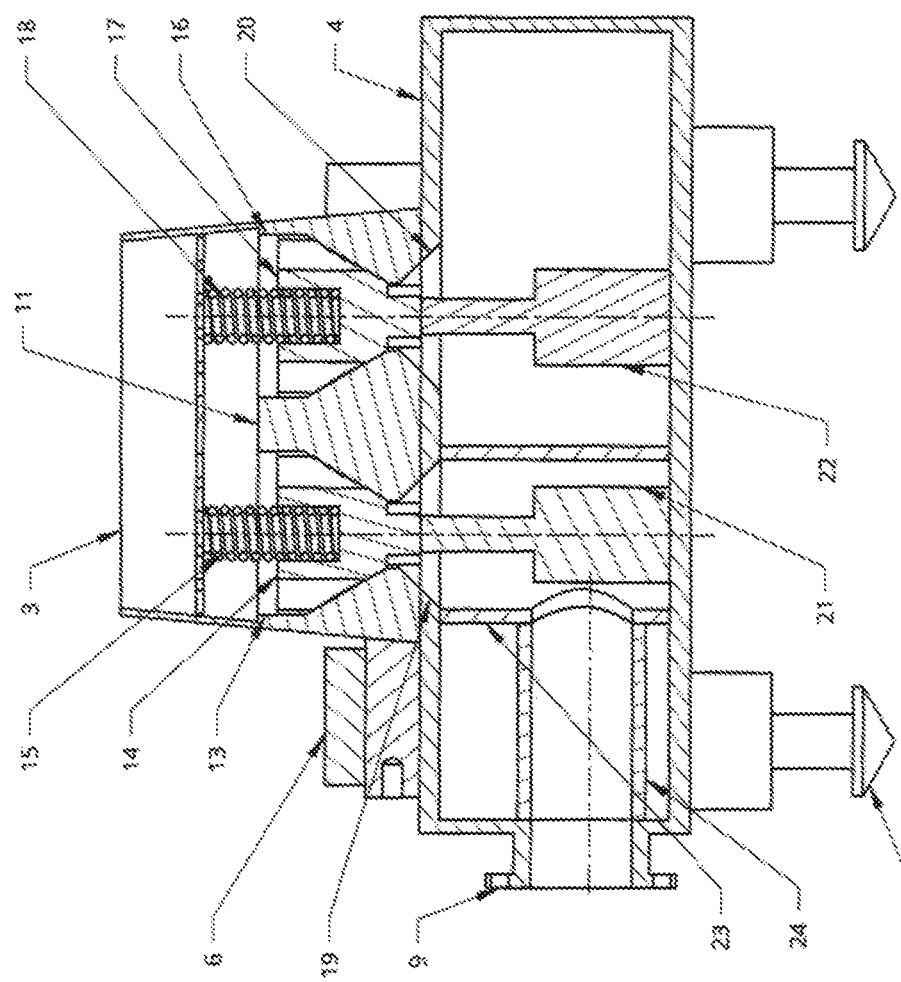
FIG. 2 is a view of the second variant of the underwater spacecraft launching complex with the ballast module used as submerged launching module.

FIG. 2 illustrates various additional features present in additional embodiments that provide additional ways of functioning of the spacecraft (1). Positioned on the bottom of accelerating module (3) is at least one air connector (13) with plug (14) retained by spring (15) that provide passage of air in and out of the accelerating module (3). At least one water connector (16) with plug (17) retained by spring (18) provide for the passage of water in and out of the accelerating module (3).

Ballast module (4) has on its top surface at least one air-port (19) and at least one water port (20) constructed and arranged to mate with ports (13) and (16) respectively. Actuators (21) and (22) respectively, are moved by any means known in the art, for example by electricity driven ball screw cylinder, etc. The air-port (19) connected hermetic passage (23) and (24) with air-port (9) and by hose (not shown) with air compressor. The air compressor may be connected to a ship. The water port (20) opens to inside of the ballast module (4) and is connected thru water port (10) and a hose (not shown) with the water pump on the ship (not shown).

In a variant of Spacecraft (1) the ballast module (4) is fixedly submerged on the seabed. The launching module (1a) and accelerating module (3) are assembled and put in vertical position on a cargo ship or platform, is filled with water thru air connector (13) and water connector (16), their plugs (14) and (17) are operated by devices on the ship or platform. The launching module (1a) and accelerating module (3) will descend to the ballast module (4) and are secured together by latching devices (5). When using structure (25) accelerating module (3) is attached to free moving block (27). Plugs (14) and (17) are opened by actuators (21) and (22) respectively using air compressor and possibly water pump (which may be on a ship or platform). Accelerating module (3) can be emptied from the water and filled with air.

At the time of the launching spacecraft (1) latching devices (5) is activated to became disconnected from the accelerating module (3). The launching module (1a) attached to the accelerating module (3) will be accelerated by hydrostatic force towards the surface of the water. At calculated moment rocket engine of the launching module (1a) is ignited and the launching module (1a) will be separated from launching pad (2) of the accelerating module (3) and begin rocket driven ascent.

Figure 3:
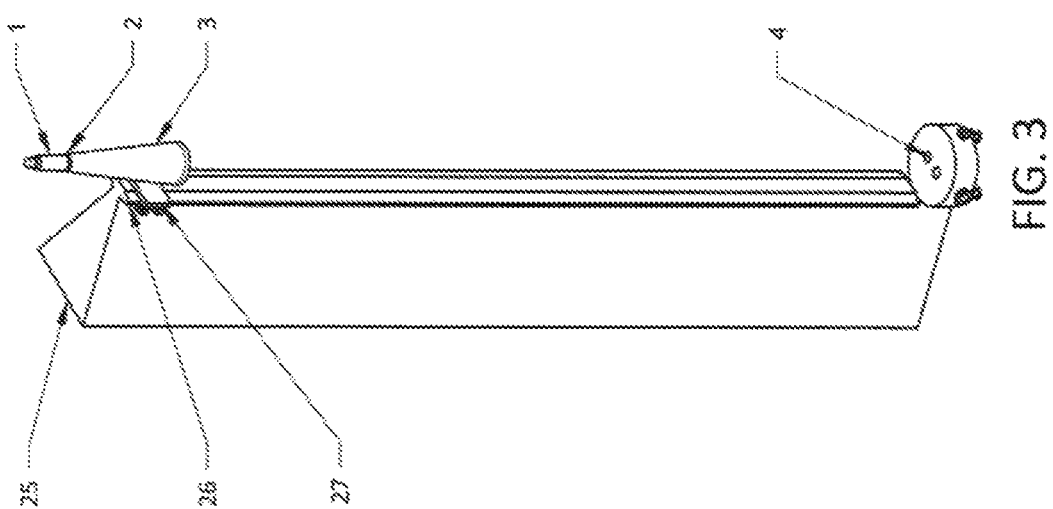
FIG. 3 is a perspective view of the underwater spacecraft launching complex with the guiding assembly that can be utilized by each of the variants of the underwater spacecraft launching complex. The second variant is shown in the state of ignition of the rocket engine and spacecraft separation from accelerating module.

FIG. 3 illustrates the launching module (1a) attached to launching pad (2) of the accelerating module (3) lifted by hydrostatic force to the position when launching pad (2) came to surface of the ocean.

In an embodiment, the rocket engine is ignited at the exact moment to affect an optimal possible preignition speed. This exact moment is such to affect the desired velocity (V) according to the equation:

$$V = \sqrt{2S\{F_{tr} - (W_s + W_{am})/g - F_{dr}\}}$$

were:
S is the distance of system travel—approximately equal to the depth of submerging.
$F_{dr}$ is the force of the drag resisting movement.
In addition,
$F_{dr}$ is also $\frac{1}{2}PV^2 A C_{dr}$
were:
P is the density of the of ocean water A is the frontal area of the moving system Cdr is the coefficient of the drag.

The above formulas illustrate that for a given Spacecraft (1) there is a maximum speed that can be achieved from buoyancy Thrust Force and a maximum depth past which no additional buoyancy velocity can be realized.

The structure (25) may be installed on the bottom of the sea in desired location and depth, it projected towards surface of the sea. Structure (25) can be made out metal, concrete or any other known material or their combination. To the structure (25) attached, at least one, profiled rail (26) that guided, at least one, free moving block (27). Engagement between profiled rail (26) and moving block (27) can be executed by any known means, including but not limited to low friction bearings, rolling elements, etc. Moving block (27) may be attached to the ballast module (4) and/or to accelerating module (3).

FIG. 4 illustrates the launching module (1a) attached to launching pad (2) of the accelerating module (3) lifted by hydrostatic force to the position when launching pad (2) reaches the surface of the ocean. The structure (25) the profiled rail (26) and free moving block (27) surrounded by sealed tubular structure (28) equipped with multiple windows (29) that can slide open and closed driven by any known means. On bottom of the structure (25) is installed latching mechanism (30) comprised of foundation (29) and attached to it at least 3 latching devices 5, described in FIG. 1.

A launching module (1a) attached to launching pad (2) of the accelerating module (3), may be attached to free moving block (27) in the position when launching pad (2) arrives at the surface of the ocean. Then the water pumps on a ship, platform or on structure (28) evacuate water from sealed tubular structure (28). With it launching module (1a) and accelerating module (3), and free moving block (27) descend and engage latching mechanism (30). After accelerating module (3) will be locked by latching mechanism (30) windows (29) may be opened and so sea water will fill structure (28). Went latching devices (5) are activated, it becomes disconnected from the accelerating module (3). The launching module (1a) may be attached to the accelerating module (3) will be accelerated by hydrostatic force towards surface of the ocean. At calculated moment, a rocket engine of the launching module (1a) is ignited and is separated from launching pad (2) of the accelerating module (3) and began rocket driven ascent.

The multiple windows (29) are shown only on the bottom portion of scaled tubular structure (28) to prevent waterfall effect that can damage the system; speed of the opening windows (29) may also be controlled for the same reason.

Figure 5:
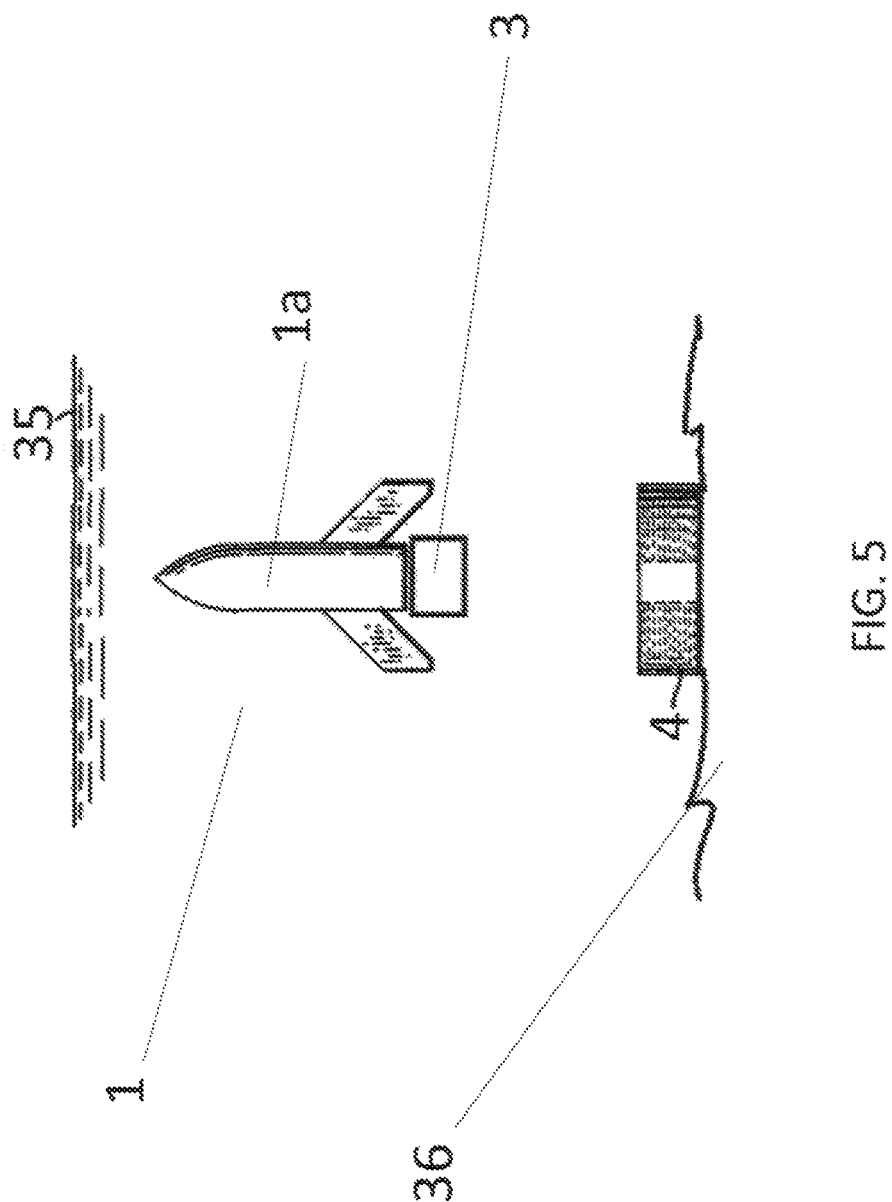
FIG. 5 is a side view of the underwater spacecraft launching complex in the process of launching.

Referring now to FIG. 5 there is shown an embodiment in which the launching process has begun. The accelerating module (3) has been separated from the ballast module (4). As a result the remainder of the spacecraft (1) has begun to travel upwards even though the rocket engine has not activated, i.e. it is undergoing non-combustion acceleration.

While this invention may be embodied in many different forms, there are described in detail herein specific preferred embodiments of the invention. The present disclosure is an exemplification of the principles of the invention and is not intended to limit the invention to the particular embodiments illustrated. All patents mentioned herein (including within the background of the disclosure), are incorporated by reference in their entirety. Furthermore, the invention encompasses any possible combination of some or all of the various embodiments described herein and/or incorporated herein and in any possible order or sequence other than those stated herein. In addition, the invention encompasses any possible combination that also specifically excludes any one or some of the various embodiments described herein and/or incorporated herein.

The above disclosure is intended to be illustrative and not exhaustive. This description will suggest, many variations and alternatives to one of ordinary skill in this art. All the alternatives and variations are intended to be included within the scope of the claims where the terms "comprising," and "including" mean "comprising/including, but not limited to". Those familiar with the art may recognize other equivalents to the specific embodiments described herein which equivalents are also intended to be encompassed by the claims.

Those skilled in the art may recognize other equivalents to the specific embodiment described herein which equivalents are intended to be encompassed by the claims attached hereto.

What is claimed is:

1. An apparatus comprising an accelerating module, a ballast module, and a launch module, the accelerating module is buoyant when in water and is not a launch module, the ballast module sinks when in water, the launch module is a spacecraft, the launch module is releasably positioned on the accelerating module, at least a portion of the ballast module defines a plane extending horizontally, the accelerating module and a ballast module are connected to each other by at least 3 reusable latching devices positioned with equal angular distance from each other relative to axes along the defined plane, the latching devices including a guided clamp, the latching device releases the engagement between the accelerating module and the ballast module by a movement of a guided clamp against the surface profiled of less than 5° angle relative to the defined plane, wherein the surface profiled less than 5° angle causes the guided clamp to release the engagement faster and with less force than would movement of the guided clamp against the surface profiled greater than a 5° angle.

2. The apparatus of claim 1, further comprising a profiled rail positioned perpendicular to the defined plane, the accelerating module constructed and arranged to traverse along the profiled rail.

3. The apparatus of claim 2, wherein the ballast module is constructed and arranged to traverse along the profiled rail and to remain at a bottom end of the profiled rail when the accelerating module rises to the top of the profiled rail.

4. The apparatus of claim 2 wherein the profiled rail is attached to a support structure.

5. An apparatus comprising a moving block, an accelerating module which is not a launch module, a ballast module, a launch module, and a profiled rail extending in a vertical direction, the moving block is constructed and arranged to traverse the profiled rail, the launch module is a spacecraft, the launch module is releasably positioned on the accelerating module, at least a portion of the ballast module defines a plane extending horizontally, the accelerating module and a ballast module are connected to each other by at least 3 reusable latching devices positioned with equal angular distance from each other relative to axes along the defined plane, the latching devices including a guided clamp, the guided clamp releases the engagement between the accelerating module and the ballast module by a movement against the surface profiled of less than 5° angle relative to the defined plane, wherein a movement against the surface profiled of less than 5° angle causes the guided clamp to release the engagement faster and with less force than would a movement against the surface of greater than a 5° angle would, and the accelerating module is constructed and arranged to be attached to the moving bloc to traverse along the profiled rail.

6. An apparatus comprising an accelerating module and a launch module, the accelerating module is buoyant when in water and is not a launch module, the launch module is a spacecraft, the launch module is releasably positioned on the accelerating module, wherein the profiled rail, the accelerating module and the launch module are all surrounded by a sealed tubular structure with openable windows positioned near the bottom half of the tubular structure, and in the bottom of the tubular structure is located foundation, the accelerating module is connected to the foundation by at least 3 reusable latching devices positioned with equal angular distance from each other relative to axes along the defined plane, the latching devices including a guided clamp positioned on top of a foundation, the guided clamp releases the engagement between the accelerating module and the launch module by a movement against the surface profiled of less than 5° angle relative to the defined plane, wherein a movement against the surface profiled of less than 5° angle causes the guided clamp to release the engagement faster and with less force than would a clamping mechanism by a movement against the surface of a greater than a 5° angle would.

* * * * *